US007617321B2

(12) United States Patent
Clark

(10) Patent No.: US 7,617,321 B2
(45) Date of Patent: Nov. 10, 2009

(54) FILE SYSTEM ARCHITECTURE REQUIRING NO DIRECT ACCESS TO USER DATA FROM A METADATA MANAGER

(75) Inventor: Thomas K. Clark, Gresham, OR (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 10/840,983

(22) Filed: May 7, 2004

(65) Prior Publication Data

US 2005/0251522 A1  Nov. 10, 2005

(51) Int. Cl.
*G06F 15/16* (2006.01)
(52) U.S. Cl. .............................. 709/229; 707/9; 707/10
(58) Field of Classification Search ................. 709/229; 707/9, 10
See application file for complete search history.

(56) References Cited

U.S. PATENT DOCUMENTS

| | | | | |
|---|---|---|---|---|
| 6,219,693 | B1 | 4/2001 | Napolitano et al. | 709/203 |
| 6,477,540 | B1* | 11/2002 | Singh et al. | 707/103 R |
| 6,839,740 | B1* | 1/2005 | Kiselev | 709/214 |
| 7,028,078 | B1* | 4/2006 | Sharma et al. | 709/214 |
| 2002/0194523 | A1 | 12/2002 | Ulrich et al. | 714/4 |
| 2003/0004947 | A1 | 1/2003 | Coverston | 707/9 |
| 2003/0135514 | A1 | 7/2003 | Patel et al. | 707/102 |
| 2003/0221124 | A1* | 11/2003 | Curran et al. | 713/201 |
| 2003/0236945 | A1* | 12/2003 | Nahum | 711/114 |
| 2004/0054748 | A1* | 3/2004 | Ackaouy et al. | 709/214 |
| 2004/0172501 | A1* | 9/2004 | Ukai et al. | 711/112 |

OTHER PUBLICATIONS

Bright et al., "A scalable architecture for clustered network attached storage" Mass Storage Systems and Technologies, 2003. (MSST 2003). Proceedings. 20th IEEE/11th NASA Goddard Conference on Apr. 7-10, 2003 pp. 196-206.*
Andrade et al., "Active Proxy-G: Optimizing the Query Execution Process in the Grid", Supercomputing, ACM/IEEE 2002 Conference Nov. 16-22, 2002 pp. 57-57.*
E. Swierk et al., The Roma Personal Metadata Service, Mobile Networks and Applications 7, 2002, pp. 407-418.
W. Cheung et al., The Model-Assisted Global Query System for Multiple Databases in Distributed Enterprises, ACM Transactions on Information Systems, vol. 14, No. 4, Oct. 1996, pp. 421-435.

(Continued)

*Primary Examiner*—Vivek Srivastava
*Assistant Examiner*—William J Goodchild
(74) *Attorney, Agent, or Firm*—Walter W. Duft; Steven L. Bennett

(57) ABSTRACT

A system, method and computer program product for implementing a distributed file system architecture requiring no direct access to user data from a metadata manager in a data storage network. Metadata operations requiring user volume access are performed via a proxy on a storage manager server that is a distributed file system client. Management of metadata can be isolated from user data because the metadata manager requires no capability to see the storage for user volumes. This allows for a distributed file management system to support heterogeneous environments without requiring any single point in the system to see all the storage.

19 Claims, 4 Drawing Sheets

OTHER PUBLICATIONS

T. Anderson et al., Serverless Network File Systems, ACM Transactions on Computer Systems, vol. 14, No. 1, Feb. 1996, pp. 41-56.

Y. Ruixin et al., An XML-Based Distributed Metadata Server (DIMES) Supporting Earth Science Metadata, Proceedings Thirteenth International Conference on Scientific and Statistical Database Management,.IEEE Computer Society, 2001, Abstract.

J. Morganthal, Enterprise Messaging with XML, Component Strategies, vol. 1, No. 11, SIGS Publications, May 1999, Abstract.

* cited by examiner

FILE SYSTEM ARCHITECTURE REQUIRING NO DIRECT ACCESS TO USER DATA FROM A METADATA MANAGER

BACKGROUND OF THE INVENTION

1. Field of the Invention

The present invention relates to data storage networks, and especially networks implementing SAN (Storage Area Network) functionality. More particularly, the invention concerns data storage networks in which heterogeneous network hosts need to access heterogeneous network storage devices using a distributed file system.

2. Description of the Prior Art

By way of background, data storage networks, such as SAN systems, provide an environment in which data storage devices are managed within a network environment. Access to the data storage devices is provided via one or more storage manager servers that handle data storage requests (e.g., copy, backup, etc.) from data client nodes (data clients) via conventional LAN (Local Area Network) or WAN (Wide Area Network) connections.

The storage manager servers are programmed data processing platforms that maintain network interface connections to the client nodes and to the storage devices that define the data storage network's pool of peripheral storage. They are commonly implemented as database servers, file servers, application servers, and for other purposes.

The data network storage devices may include any number of interconnected data storage subsystems comprising magnetic disk drive arrays, optical disk drive arrays, magnetic tape libraries, etc. In some cases, the data storage network is superimposed on the LAN or WAN that hosts the client nodes, such that the network carries both data storage traffic (e.g., TCP/IP-encapsulated i-SCSI packets) and conventional client traffic (e.g., TCP/IP). More commonly, the data storage network is a dedicated network that carries only data storage traffic. In all but the smallest dedicated data storage networks, the required inter-connectivity is provided by way of high speed arbitrated loop arrangements or switching fabrics implementing the Fibre Channel protocol, with the latter being more common. Typical inter-connectivity components include copper or fiber optic cables, hubs, bridges, gateways, switches, directors, and other telecommunication equipment designed for high speed data transfer between and among all of the interconnected storage manager servers and storage devices that comprise the data storage network. Dedicated Ethernet data storage networks may also be implemented using conventional Ethernet hardware and the i-SCSI protocol (i.e., wherein block I/O and SCSI commands are encapsulated in TCP/IP packets).

FIG. 1 shows an exemplary dedicated data storage network 2 that includes a pair of storage manager servers 4 and 6 interconnected to a pair of data storage devices 8 and 10 by way of a high-speed SAN connectivity scheme. It will be appreciated that in an actual data storage network, many additional storage devices could be present. There could likewise be additional storage manager servers. It should be further understood that the individual connection components that comprise the network fabric itself, such as switches, directors, hubs, links, etc., are not shown in FIG. 1. The storage manager servers 4 and 8 additionally communicate with a local area network (LAN) 12 (or alternatively a WAN) that comprises one or more data processing clients, two of which are identified as client systems 14 and 16. Data sets associated with the client systems 14 and 16 can be stored in data volumes logically defined on one or both of the storage devices 8 and 10 by way of the storage manager servers 4 and 6.

The data storage devices found in a data storage network such as that shown in FIG. 1 are in many cases comprised of a heterogeneous assortment of equipment from different vendors. Similarly, the storage manager servers can be implemented using heterogeneous data processing platforms running different operating systems. Thus, in FIG. 1, the data storage devices 8 and 10 might be RAID (Redundant Array of Inexpensive Disks) subsystems from two different vendors, or one might be a RAID array subsystem while the other is a JBOD (Just a Bunch Of Disks) subsystem. Similarly, the storage manager server 4 might be implemented using an Intel x86 processor running a Microsoft Windows® operating system, while the storage manager server 6 might comprise a PowerPC® processor running an IBM AIX® operating system.

Historically, the interoperability between data storage equipment from different vendors has been weak. One way to accommodate such incompatibilities in a data storage network is to partition the network storage devices into homogeneous groups or "islands," and to assign such partitions to compatible storage manager servers. Each storage manager server runs its own file system and is allotted its own set of storage devices for its exclusive use within the data storage network. For example, in FIG. 1, storage manager server 4 might be allocated to data storage device 8 while storage manager server 6 is assigned to data storage device 10.

The foregoing approach can be limiting from a data storage network user's point of view because data is managed on a server-by-server basis instead of at a network-wide level. To address this concern, the concept of a distributed file system has been proposed. The goal of a distributed file system in a data storage network is to provide benefits such as a global namespace for files, shared access from any storage manager server to any network storage device, and centralized, policy-based management. This guarantees that data network clients will be able to access their files using the same filenames regardless of which storage manager server is used to retrieve the data, and no matter which storage device stores the data.

A distributed file system also facilitates what is referred to in the data storage art as "out-of-band storage virtualization." The IBM TotalStorage® SAN File System is an exemplary distributed file system that is based on this approach. The term "out-of-band storage virtualization" means that user data and metadata are stored in different places. In the data storage art, the term "user" data refers to files and their information contents, whereas the term "metadata" (literally "data about data") refers to the information needed to manage and maintain such files. This includes file names, ownership, access permissions, physical location, and other characteristics. Metadata in an out-of-band storage virtualization environment is handled by a dedicated metadata server that cooperates with the storage manager servers to implement data storage and retrieval operations the data storage network. In FIG. 1, a metadata server (hereinafter metadata "manager") is shown by reference numeral 18. The metadata manager 18 communicates with the storage manager servers 4 and 6 via a dedicated control network 20, using TCP/IP packet communication or the like. The connectivity infrastructure of the data storage network 2, or the LAN/WAN 12, could also support this communication. The metadata handled by the metadata manager 18 is stored in data storage devices within the data storage network 2. Thus, in FIG. 1, the data storage devices 8 and 10 could each have one or more data volumes dedicated to the storage of metadata.

The metadata manager 18 processes metadata requests from the storage manager servers 4 and 6, which may be thought of as "clients" of the metadata manager's server functions. When a data file transfer request is made to one of the storage manager servers 4 or 6, it queries the metadata manager 18 to determine the file's location, and other control information. Once the storage manager server 4 or 6 has obtained access to the file, it performs the required data transfer operation without further intervention by the metadata manager 18.

One of the implications of a distributed file system with out-of-band storage virtualization is that incompatibilities arising from the use of heterogeneous equipment within a data storage network become an issue that must be addressed. Among other things, the metadata manager 18 requires access to both user data and metadata in order to support various management functions, such as commissioning and decommissioning data volumes, and moving files between different volumes or between different storage pools (i.e., volume groups), and restore and backup. If the user data and the metadata of a data storage network are located on heterogeneous storage devices, as is the case in FIG. 1, the metadata manager 18 must be capable of accessing those devices, and the devices must be capable of handling requests from both the metadata manager 18 and the storage manager servers 4 and 6. Incompatibilities between products from various vendors can severely limit the implementation of these functions.

It is to improvements in distributed file system implementation that the present invention is directed. In particular, what is needed is a distributed file system architecture that supports a data storage network comprising heterogeneous equipment.

SUMMARY OF THE INVENTION

The foregoing problems are solved and an advance in the art is obtained by a system, method and computer program product for implementing a distributed file system architecture requiring no direct access to user data from a metadata manager in a data storage network. Metadata operations requiring user volume access are performed via a proxy on a storage manager server that is a distributed file system client. Management of metadata is isolated from user data because the metadata manager requires no capability to see the storage for user volumes. This allows for a distributed file system to support heterogeneous environments without requiring any single point in the system to see all of the storage.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
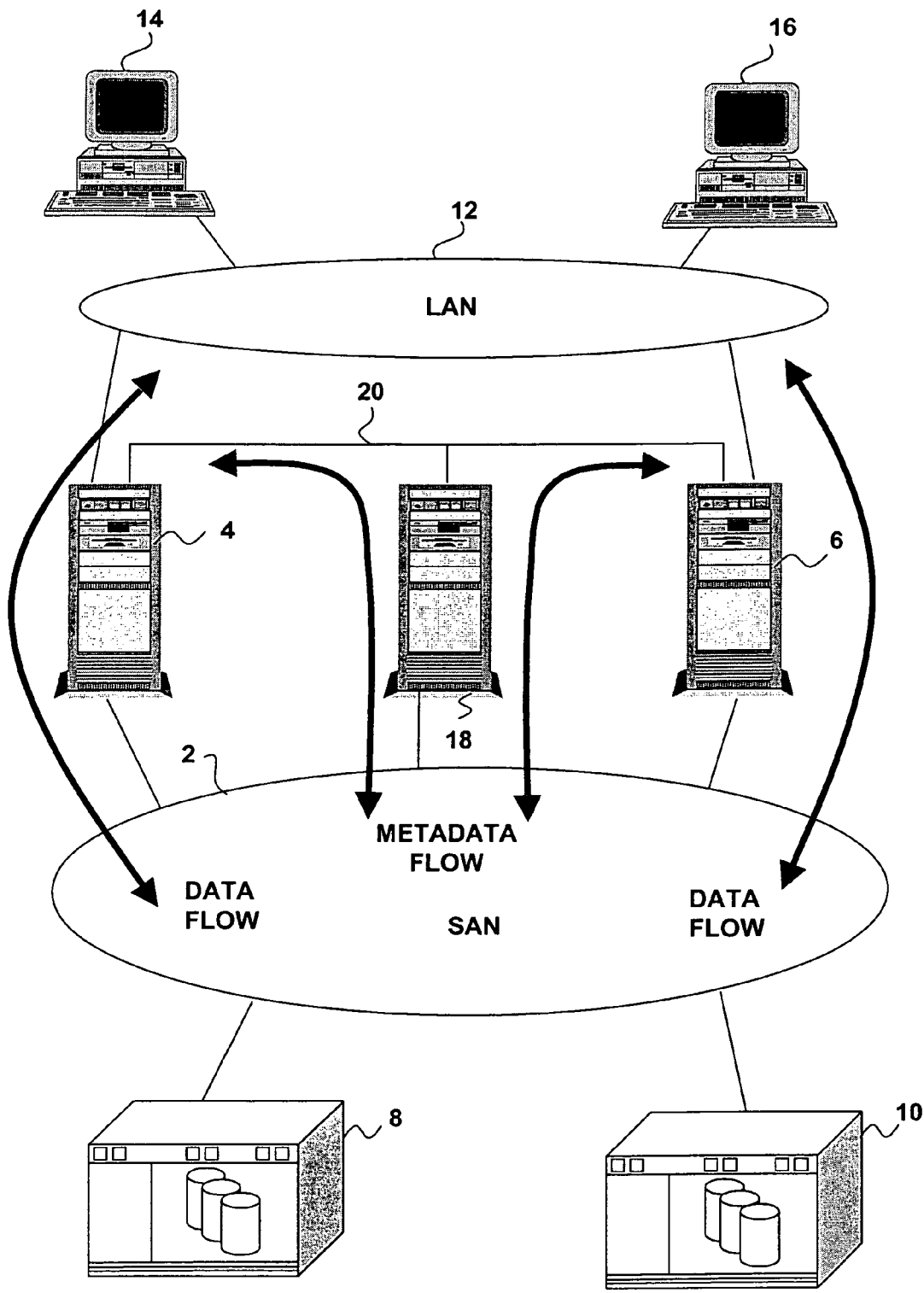
FIG. 1 is a functional block diagram showing a conventional data storage network implementing a distributed file system.
Figure 2:
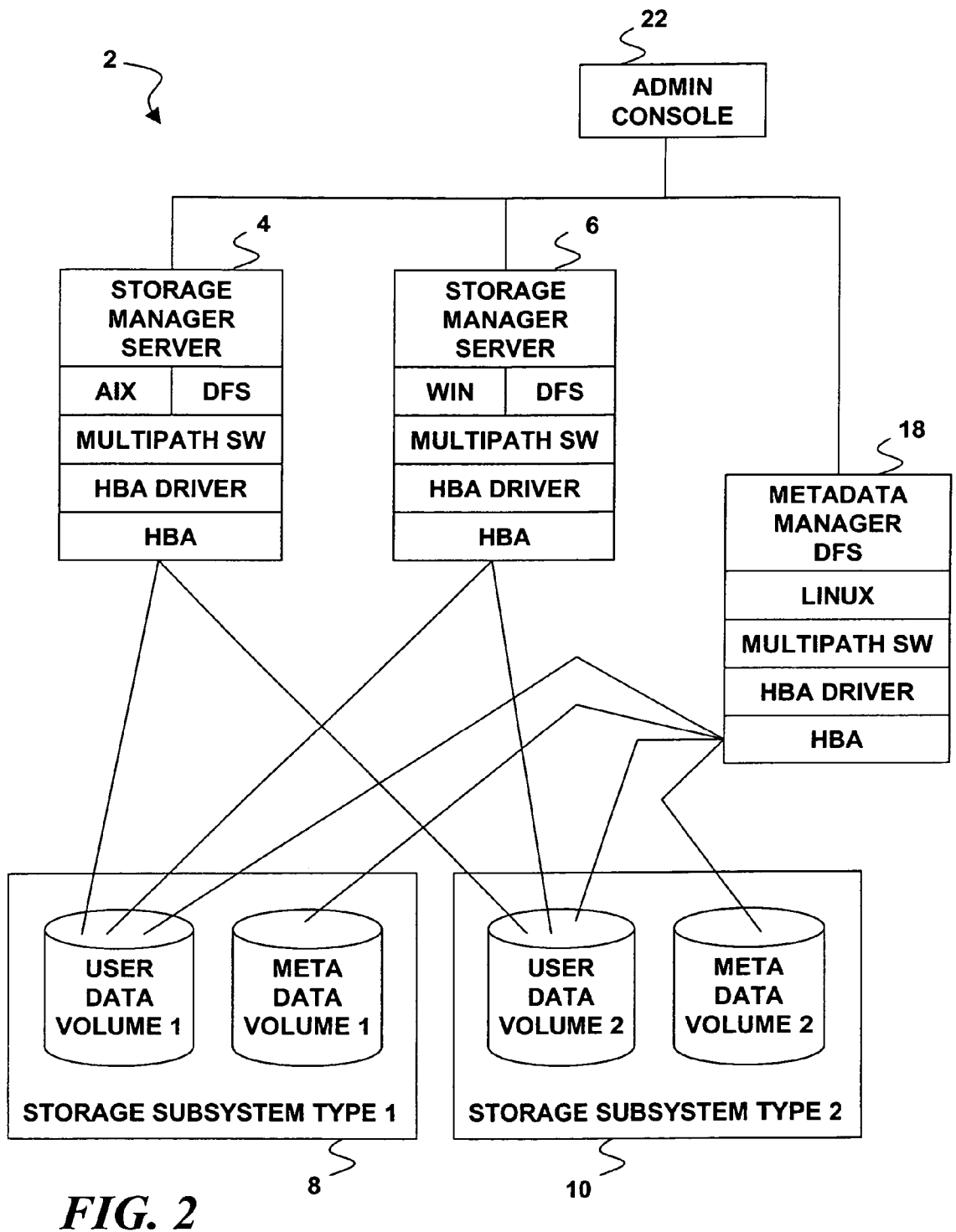
FIG. 2 is a functional block diagram showing details of the distributed file system in the data storage network of FIG. 1.

Prior to describing exemplary embodiments of the invention, it will be helpful to continue the background discussion above to more specifically illuminate the problems facing the implementation of distributed file system-based data storage networks. FIG. 2 shows additional details of the distributed file system components in the data storage network 2 of FIG. 1. In particular, FIG. 2 illustrates the operating system, file system, network stack, and network interface components of the storage manager servers 4 and 6, and the metadata manager 18. Again, the network fabric components are not shown, but it is assumed for the sake of example only that the data storage network 2 is a Fibre Channel implementation. As such, the network interface adaptors of the storage manager servers 4 and 6, as well as the metadata manager 18, are shown as being HBAs (Fibre Channel Host Bus Adaptors) and the adaptor device drivers are shown as being HBA drivers.

Conventional multipathing software (for managing multiple paths to storage devices) is shown to reside in the network stack above each HBA driver. Above the multipathing software is an operating system and a distributed file system (DFS) instance. In the storage manager servers 4 and 6, a client component of the distributed file system is installed. By way of example only, the client-side DFS can be implemented as an IBM TotalStorage® SAN File System driver for the Linux operating system. A server component of the distributed file system is installed in the metadata manager 18. The server component can be implemented using the IBM TotalStorage® SAN File System Server product. This software can be implemented as an application that runs with support from an underlying operating system.

It will be appreciated that any conventional operating system that supports the proxy functions to be described hereinafter can be employed on the storage manager servers 4 and 6, and the metadata manager 18. The same operating system may be used for each of these entities, or they may all be different, depending on design choice, convenience and compatibility.

The data storage devices 8 and 10 can be implemented using the same or different types of storage subsystems. By way of example only, FIG. 2 illustrates a heterogeneous configuration in which the storage devices 8 and 10 are different storage subsystem types. Each data storage device contains a user data volume and a metadata volume. An administration console 22 is also shown in FIG. 2. It is conventionally used for issuing data storage network administrative commands to the metadata manager 18.

There are problems associated with running a distributed file system in a heterogeneous data network storage environment as shown in FIG. 2. This is particularly true if the data storage managers 4 and 6, and the metadata manager 18, do not all run the same type of operating system, networking software, or networking hardware. These problems stem from two requirements that are inherent in a distributed file system environment as shown in FIG. 2:

1. Each storage device 8 and 10 must be capable of being accessed from each of the storage manager servers 4 and 6, and the metadata manager 18; and
2. Each storage manager server 4 and 6, and the metadata manager 18, must be capable of interacting with each of the storage devices 8 and 10.

The first requirement poses a problem because conventional data storage devices are not always designed to interoperate well with different network hosts running different operating systems, network stacks and network adaptors. Moreover, many storage devices suffer a performance penalty when they are accessed from multiple paths (physical links) connected to different storage device controllers, which would be necessary to allow access from plural heterogeneous hosts.

The second requirement poses a problem because conventional hosts in a data storage network are not easily adapted to access heterogeneous storage devices. For example, most hosts implement multipath redundancy using some form of multipathing software to manage the HBA ports that connect to the physical links. Most multipathing software supports only a single vendor's storage and is unable to share an HBA adaptor with other multipathing software that supports a different vendor's storage. The ability to access different storage devices also requires that hosts use different versions of device drivers for a given brand/model of HBA, and device drivers do not like to share devices. These issues effectively mandate that separate HBA/device driver/multipathing software combinations be used for each data storage system accessed from a particular host. As such, the configuration of FIG. 2 would actually require multiple stacks rather than the single stack shown on each host; one stack for each type of storage device that a host needs to access. A further complication is that some operating systems only allow for a single version of a device driver for a particular type of HBA, so a host running such an operating system may require HBAs from different vendors to create a viable heterogeneous storage access implementation.

As set forth by way of summary above, the foregoing problems can be overcome by implementing a distributed file system architecture requiring no direct access to user data from the metadata manager 18 in the data storage network 2. Metadata operations requiring user volume access are performed via a proxy on each storage manager server 4 and 6 (or any other network host that is a distributed file system client of the metadata manager 18). The management of metadata can thus be completely isolated from user data because the metadata manager 18 requires no capability to see the storage for user volumes. This solution allows a distributed file system to support heterogeneous environments without requiring any single point in the system to see all the storage. Such an architecture allows the network user complete freedom to divide the data storage network 2 into homogeneous islands or to be homogeneous in one area of the file system and heterogeneous in another area, based on user needs and configurations supported by storage vendors.

The metadata manager 18 would typically need to access user data volumes for a variety of administrative purposes, including the following:

Commission and decommission of volumes, including writing (or removing) a distributed file system label;
User volume drain (moving data from one volume in a storage pool to other volumes in the same storage pool);
Move data (moving data from one storage pool to another storage pool); and
Metadata manager-based backup/restore.

In accordance with the invention, each of the above administrative operations (and possibly others) can be performed by the metadata manager 18 in cooperation with one of the storage manager servers 4 or 6 (or other distributed file system client) that has access to the required user data volume(s). Note that although the storage manager servers 4 and 6 will be used for the required user data volume access, the metadata manager 18 can still continue to coordinate the administrative operations. Thus, functions that are intrinsic to the metadata manager's software internals, such as locking, logging, and maintaining transaction semantics for administrative operations, can continue to be handled in conventional fashion.

Figure 3:
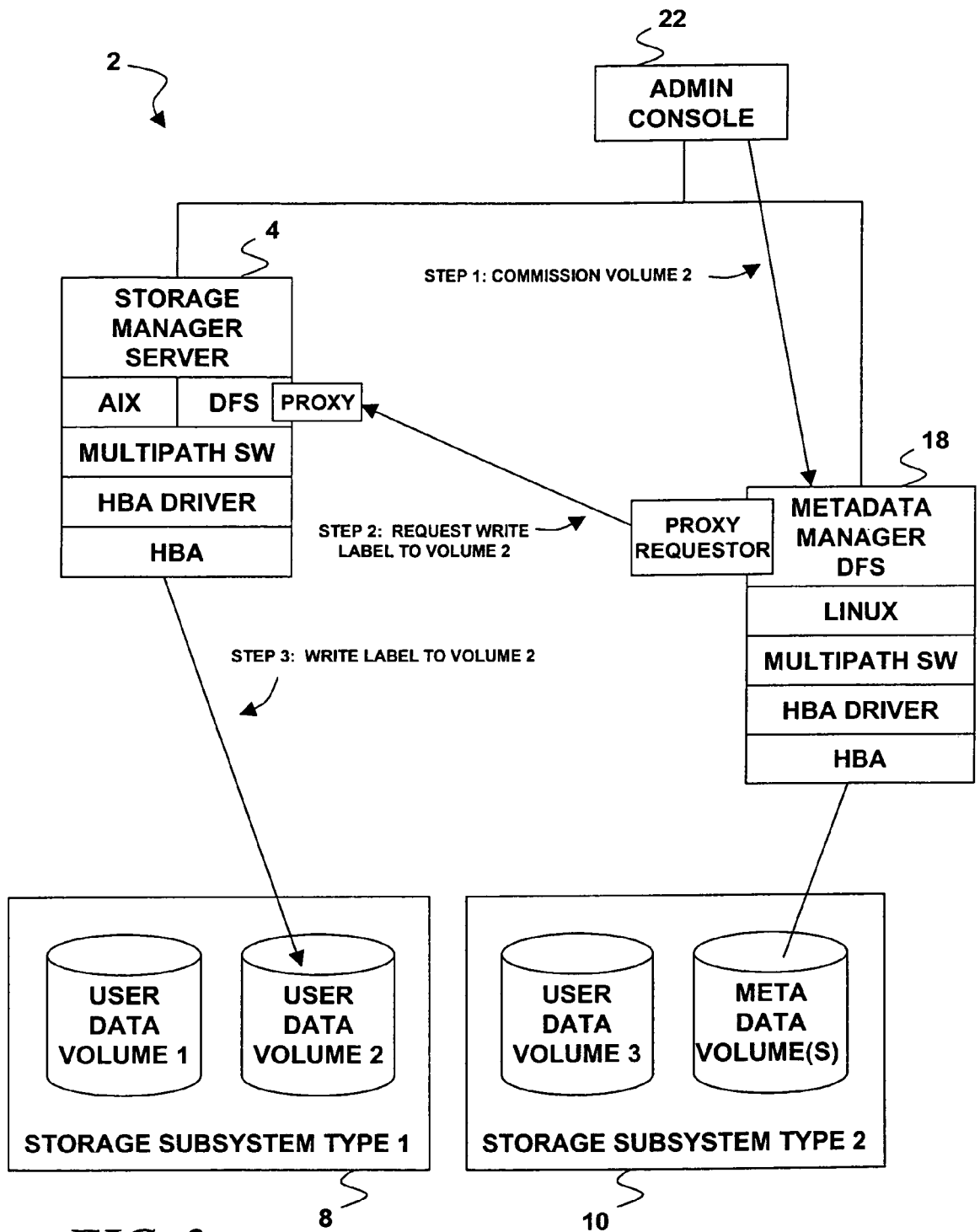
FIG. 3 is a functional block diagram showing use of a modified form of the data storage network of FIGS. 1 and 2 to perform a data volume commissioning operation in accordance with the invention, wherein new data volumes are established using unassigned storage capacity (as described in more detail below)

Turning now to FIG. 3, an exemplary administrative operation involving the commission/decommission of volumes in accordance with the invention will now be described. Note that FIG. 3 illustrates the above-described data network 2, but the storage manager server 6 is not shown to facilitate clarity. In addition, all metadata volumes in the example of FIG. 3 are now located on a single storage device (storage subsystem 10) that is accessible by the metadata manager 18. Finally, the distributed file system software instances in each of the storage manager server 4 and the metadata manager 18 are enhanced to implement the latter's use of the former as a proxy for accessing user data volumes. In particular, the storage manager server 4 is provided with a proxy function and the metadata manager 18 is provided with a proxy request function.

The numbered arrows in FIG. 3 represent an exemplary sequence of operations to be performed when it is desired to commission a new data volume in the data storage network 2. It is assumed that the user data volume 2 situated in the storage device 8 is the volume to be added, and that this data volume is accessible to the storage manager server 4. The volume commission operation will normally be initiated from the administrative console 22, either by a human operator or an automated software program that monitors resources in the data storage network 2. It is assumed that the administrative console 22 has previously queried the metadata manager 18 to identify uncommissioned user data volumes that are available for commissioning, and that the metadata manager has identified user data volume 2 as being available by querying the storage manager server 4 (using the proxy request technique of the invention). Step 1 of the commissioning operation entails the administrative console 22 instructing the metadata manager 18 to commission user data volume 2. Initially, the metadata manager 18 performs conventional internal management associated with the commissioning operation. Then in step 2, the proxy requestor in the metadata manager 18 issues a proxy request to the storage manager server 4 to write a volume label to the user data volume 2. This request passes parameters that identify the data user volume 2 and specifies a distributed file system label to be written. In step 3, the proxy in the storage manager server 4 responds to the proxy request by causing the volume label to be written to the user data volume 2. This step can be performed by the proxy utilizing the storage manager server's existing data storage device access functions (e.g., via an API (Application Programming Interface) call, an operating system call, etc.).

There are various ways that the above-described proxy mechanism can be implemented by the metadata manager server 18 and the storage manager server 4. One approach is to use conventional remote procedure call (RPC) tools of the type provided by many operating systems. If a conventional RPC model is used, the metadata manager's proxy requester component can be implemented as an RPC client that invokes RPC client stub functions. The storage manager server's proxy component can in turn be implemented as an RPC server that invokes RPC server stub functions. Any other suitable inter-process communication technique that allows the metadata manager 18 to invoke data storage device access functions in the storage manager server 4 could also be used to implement the proxy mechanism of the invention.

Note that in the foregoing operation, the actual user data volume picked for commissioning is chosen from the view-point of the storage manager server 4. This choice is not of concern to the metadata manager 18. The metadata manager 18 simply needs to know that the chosen volume has been assigned the specified volume identifier and label to write for the commission. The procedure for decommissioning a data volume is essentially the inverse of the commissioning procedure. The metadata manager 18 instructs the storage manager server 4 as to which label to erase for decommission, and the storage manager server carries out the requested operation.

Figure 4:
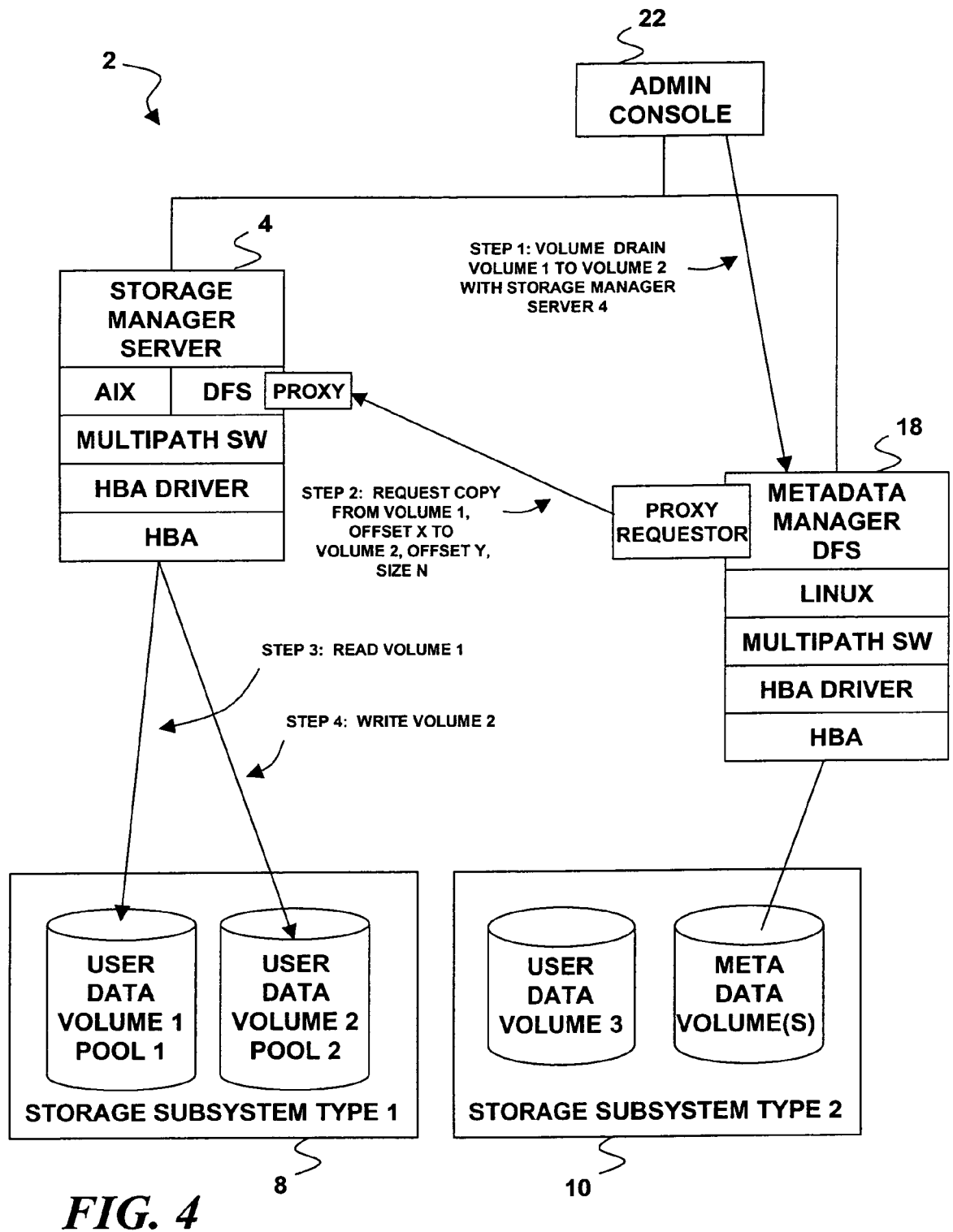
FIG. 4 is a functional block diagram showing use of a modified form of the data storage network of FIGS. 1 and 2 to perform a data volume drain operation in accordance with the invention, wherein data is moved from one data storage resource to another (as described in more detail below).

Turning now to FIG. 4, an exemplary volume drain operation in accordance with the invention will now be described. As in the case of FIG. 3, FIG. 4 illustrates the above-described data network 2, but the storage manager server 6 is not shown to facilitate clarity. All metadata volumes in the example of FIG. 4 are also located on a single storage subsystem (storage device 10) that is accessible by the metadata manager 18. Finally, the distributed file system software instances in each of the storage manager server 4 and the metadata manager 18 are enhanced to implement the latter's use of the former as a proxy for accessing user data volumes. In particular, the storage manager server 4 is provided with a proxy function and the metadata manager 18 is provided with a proxy request function.

The numbered arrows in FIG. 4 represent an exemplary sequence of operations to be performed when it is desired to perform a volume drain or move data operation in the data storage network 2. It is assumed that the data volumes involved in the transaction are user volumes 1 and 2, and that they are accessible to the storage manager server 4. It is further assumed that user data volume 1 is in a first data pool 1 and that user volume 2 is in a second data pool 2. As such, a volume drain from user data volume 1 to user data volume 2 may also be considered a data move operation.

The core operations to access the user data volumes 1 and 2 are a read from data volume 1 and a write to user data volume 2. The volume drain operation will normally be initiated from the administrative console 22, either by a human operator or an automated software program that monitors resources in the data storage network 2. In Step 1 of the volume drain operation, the administrative console 22 issues a command instructing the metadata manager 18 to perform a volume drain from user data volume 1 to user data volume 2 using the storage manager server 4. Initially, the metadata manager 18 performs conventional internal management associated with the volume drain operation. Then in step 2, the proxy requestor in the metadata manager 18 issues a proxy request (using any suitable inter-process communication technique, as discussed above) to the storage manager server 4 to read from user data volume 1 and write to user data volume 2. The request passes parameters that identify the user data volume 1, the disk offset of the data to be read, the user data volume 2, the disk offset of the data to be written, and the size of the data to be transferred. In step 3, the proxy in the storage manager server 4 responds to the request by causing the data to be read from user data volume 1. In step 4, the proxy in the storage manager server 4 causes this data to be written to user data volume 2. Again, the storage manager server's existing data storage device access functions can be used by the proxy to implement steps 3 and 4 (e.g., via an API call, an operating system call, etc.).

It will be appreciated that there are several advantages associated with use of the invention to perform administrative functions without access by the metadata manager 18 to user data. One is that storage manager server-based virtualization, including the use of logical volume managers (LVMs), can be implemented in a distributed file system environment. All that is required is that the metadata manager 18 be capable of cooperating with the storage manager server 4 or 6 that runs the logical volume manager to write a distributed file system label on the virtualized volume, and that it know the size of the volume. Otherwise, the fact that the volume is virtualized at the storage manager server 4 or 6 is irrelevant to the metadata manager's ability to manage space allocation for it.

Another advantage provided by the invention is that it facilitates data storage network scalability. It is a present goal of distributed file systems to support access to petabytes of data, which could involve several thousand volumes (depending on volume size). Requiring the metadata manager 18 to access such a large number of volumes would be problematic because the metadata manager would need to scan all of the storage devices on network startup and as configurations change.

A further advantage of the invention is provided in the area of network security. Data storage network users are accustomed to creating multiple zones in their storage networks, providing only necessary access paths to storage based on application needs. The current approach that requires a metadata manager to access all user data volumes forces a zone that includes all volumes in the system, which may be uncomfortable to many users. By no longer requiring the metadata manager 18 to access user data volumes, users are given flexibility in how narrow or broad their data storage network zoning needs to be based on application needs.

Accordingly, a file system architecture requiring no direct access to user data from a metadata manager has been disclosed. It will be appreciated that the inventive concepts may be variously embodied in any of a data processing system, a machine implemented method, and a computer program product in which programming means are recorded on one or more data storage media for use in controlling a data processing system to perform the required functions. Although various embodiments of the invention have been described, it should be apparent that many variations and alternative embodiments could be implemented in accordance with the invention. For example, in addition to operations such as volume commissioning, volume decommissioning, volume drain, and data move, other operations, such as data backup and restore, could also be performed in accordance with the principles of the invention. It is understood, therefore, that the invention is not to be in any way limited except in accordance with the spirit of the appended claims and their equivalents.

What is claimed is:

1. A method for implementing a data storage network distributed file system without requiring direct access to user data from a metadata manager, comprising:

establishing one or more metadata storage volumes that are accessible by said metadata manager on a single homogeneous type of one or more data storage devices;

storing all distributed file system metadata on said one or more metadata storage volumes on said single homogeneous type of one or more data storage devices;

establishing one or more user data storage volumes that are accessible by one or more storage manager servers on one or more types of data storage device;

said metadata manager only accessing said one or more metadata storage volumes in said data storage network, and not directly accessing said one or more user data storage volumes;

generating administrative requests from said metadata manager to a proxy in one of said storage manager servers for metadata manager access to said one or more user data volumes in said data storage network for performing administrative actions specified by a data storage network administrator or administration program, said administrative requests involving said metadata manager requesting manipulation of data stored on said one or more user data volumes on its own behalf in support of said administrative actions; and accessing said one or more user data volumes from said storage manager server in response to said requests to said proxy.

2. A method in accordance with claim 1 wherein said requests comprise volume commission requests and include parameters for consumption by said proxy that include a volume identifier and a volume label to be written.

3. A method in accordance with claim 2 wherein said proxy causes a volume label to be written to a data volume according to said parameters passed by said metadata manager.

4. A method in accordance with claim 1 wherein said requests include volume drain and data move requests and include parameters for consumption by said proxy that include a read volume identifier, a read volume offset, a write volume identifier, a write volume offset, and a data size indicator.

5. A method in accordance with claim 4 wherein said proxy causes data to be read from a read volume and said data to be written to a write volume according to said parameters passed by said metadata manager.

6. A method in accordance with claim 1 wherein said requests comprise remote procedure calls.

7. A method in accordance with claim 1 wherein said requests include volume commission requests, volume decommission requests, volume drain requests, data move requests, data backup requests and data restore requests.

8. A method system in accordance with claim 1 wherein said storage manager server implements logical volume management.

9. A system for implementing a data storage network distributed file system without requiring direct access to user data from a metadata manager, comprising:
a metadata manager;
one or more storage manager servers;
one or more metadata storage volumes that are accessible by said metadata manager on a single homogeneous type of one or more data storage devices;
one or more user data storage volumes that are accessible by said one or more storage manager servers on one or more types of data storage device;
all metadata for said distributed file system being stored on said one or more metadata storage volumes on said single homogeneous type of one or more data storage devices;
said metadata manager comprising one or more processors and a memory coupled to said processor(s), said memory including a computer readable storage medium tangibly embodying at least one program of instructions executable by said processor(s) to perform operations, comprising:
accessing said one or more metadata storage volumes in said data storage network, and not directly accessing said one or more user data storage volumes; and
generating administrative requests from said metadata manager to a proxy in one of said storage manager servers for metadata manager access to said one or more user data volumes in said data storage network for performing administrative actions specified by a data storage network administrator or administration program, said administrative requests involving said metadata manager requesting manipulation of data stored on said one or more user data volumes on its own behalf in support of said administrative actions; and said storage manager servers comprising one or more processors and a memory coupled to said processor(s), said memory including a computer readable storage medium tangibly embodying at least one program of instructions executable by said processor(s) to perform operations, comprising:
implementing a proxy for receiving said administrative requests from said metadata manager for metadata manager access to said one or more user data volumes in said data storage network;
receiving said administrative requests from said metadata manager; and
accessing said user data volumes in response to said requests received by said proxy.

10. A system in accordance with claim 9 wherein said requests comprise volume commission requests and include parameters for consumption by said proxy that include a volume identifier and a volume label to be written.

11. A system in accordance with claim 10 wherein said storage manager server causes a volume label to be written to a data volume according to said parameters passed by said metadata manager.

12. A system in accordance with claim 9 wherein said requests comprise volume drain and data move requests and include parameters for consumption by said proxy that include a read volume identifier, a read volume offset, a write volume identifier, a write volume offset, and a data size indicator.

13. A system in accordance with claim 12 wherein said storage manager server causes data to be from a read volume and said data to be written to a write volume according to said parameters passed by said metadata manager.

14. A system in accordance with claim 9 wherein said requests comprise remote procedure calls.

15. A system in accordance with claim 9 wherein said requests include volume commission requests, volume decommission requests, volume drain requests, data move requests, data backup requests and data restore requests.

16. A system in accordance with claim 9 wherein said storage manager server implements logical volume management.

17. A metadata manager for implementing a data storage network distributed file system without requiring direct access to user data from said metadata manager, comprising:
one or more processors;
a memory coupled to said processor(s), said memory including a computer readable storage medium tangibly embodying at least one program of instructions executable by said processor(s) to perform operations, comprising:
managing one or more metadata storage volumes that are accessible by said metadata manager on a single homogeneous type of one or more data storage devices;
storing all distributed file system metadata on said one or more metadata storage volumes on said single homogeneous type of one or more data storage devices;
said metadata storage volumes being distinct from one or more user data storage volumes that are accessible by one or more storage manager servers on one or more types of data storage device;
said metadata manager only accessing said one or more metadata storage volumes in said data storage network, and not directly accessing said one or more user data storage volumes; and generating administrative requests from said metadata manager to a proxy in one of said storage manager servers for metadata manager access to said one or more user data volumes in said data storage network for performing administrative actions specified by a data storage network administrator or administration program, said administrative requests involving said metadata manager requesting manipulation of data stored on said one or more user data volumes on its own behalf in support of said administrative actions.

18. A storage manager server for implementing a data storage network distributed file system without direct access to user data from a metadata manager, comprising:

one or more processors;

a memory coupled to said processor(s), said memory including a computer readable storage medium tangibly embodying at least one program of instructions executable by said processor(s) to perform operations, comprising:

supporting access to one or more user data storage volumes by said storage manager server on one or more types of data storage device and which are not directly accessible by a metadata manager that manages one or more metadata storage volumes that are accessible by said metadata manager on a single homogeneous type of one or more data storage devices, said metadata storage volumes storing all distributed file system metadata on said single homogeneous type of one or more data storage devices;

said metadata manager only accessing said one or more metadata storage volumes in said data storage network, and not directly accessing said one or more user data storage volumes;

implementing a proxy for receiving administrative requests from said metadata manager for metadata manager access to said one or more user data volumes in said data storage network for performing administrative actions specified by a data storage network administrator or administration program, said administrative requests involving said metadata manager requesting manipulation of data stored on said one or more user data volumes on its own behalf in support of said administrative actions;

receiving said administrative requests from said metadata manager; and accessing said user data volumes in response to said administrative requests received by said proxy.

19. A computer program product for implementing a data storage network distributed file system without direct access to user data from a metadata manager, comprising:

one or more computer readable data storage media;

program instructions recorded on said data storage media for programming data processing platforms in said data storage network to operate by:

supporting access to one or more metadata storage volumes by said metadata manager on a single homogeneous type of one or more data storage devices;

storing all distributed file system metadata on said one or more metadata storage volumes on said single homogeneous type of one or more data storage devices;

supporting access to one or more user data storage volumes by one or more storage manager servers on one or more types of data storage device;

said metadata manager only accessing said one or more metadata storage volumes in said data storage network, and not directly accessing said one or more user data storage volumes;

generating administrative requests from said metadata manager to a proxy in one of said storage manager servers for metadata manager access to said one or more user data volumes in said data storage network for performing administrative actions specified by a data storage network administrator or administration program, said administrative requests involving said metadata manager requesting manipulation of data stored on said one or more user data volumes on its own behalf in support of said administrative actions; and accessing said one or more user data volumes from said storage manager server in response to said administrative requests to said proxy.

* * * * *

UNITED STATES PATENT AND TRADEMARK OFFICE
CERTIFICATE OF CORRECTION

PATENT NO.      : 7,617,321 B2                                                    Page 1 of 1
APPLICATION NO. : 10/840983
DATED           : November 10, 2009
INVENTOR(S)     : Thomas K. Clark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1587 days.

Signed and Sealed this

Nineteenth Day of October, 2010

David J. Kappos
*Director of the United States Patent and Trademark Office*